United States Patent [19]

Farrell

[11] 3,876,358

[45] Apr. 8, 1975

[54] INJECTION MOLDING SUPPORTING STRUCTURE
[75] Inventor: John J. Farrell, Green Brook, N.J.
[73] Assignee: Farrell Patent Company, Dunellen, N.J.
[22] Filed: July 6, 1973
[21] Appl. No.: 377,053

[52] U.S. Cl. .............................................. 425/243
[51] Int. Cl. ............................................... B29c 1/00
[58] Field of Search ............ 425/243, 242, DIG. 9; 164/348, 338; 249/111; 165/136, 168

[56] References Cited
UNITED STATES PATENTS
2,878,515   3/1959   Strauss ............................ 425/243
2,923,976   2/1960   Strauss ............................ 425/243
3,023,458   3/1962   Seymour ......................... 425/245 X Primary Examiner—Francis S. Husar
Assistant Examiner—David B. Smith
Attorney, Agent, or Firm—Marvin Feldman; J. B. Felshin

[57] ABSTRACT

To limit heat flow from a mold to its supporting frame, a metal slab is placed between the mold and frame, and the surfaces of the slab that touch the mold and frame are provided with discontinuities for limiting the areas of the slab faces that can convey heat by conduction. Cooling chambers in the slab are correlated with the discontinuities, that include parallel grooves, in such a way that most of the heat transmitting volume in the slab is interrupted by the cooling chambers.

6 Claims, 5 Drawing Figures

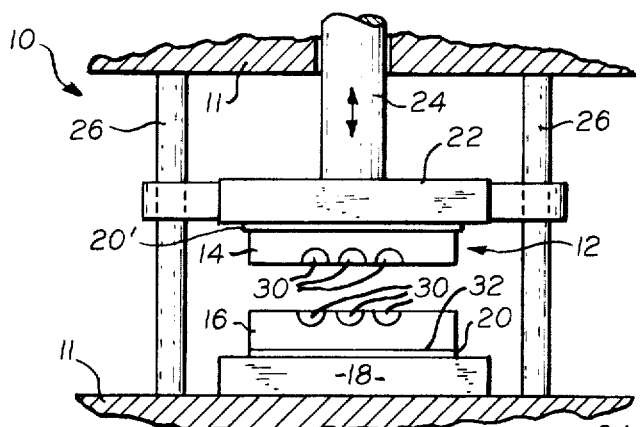
FIG. 1.
FIG. 4.
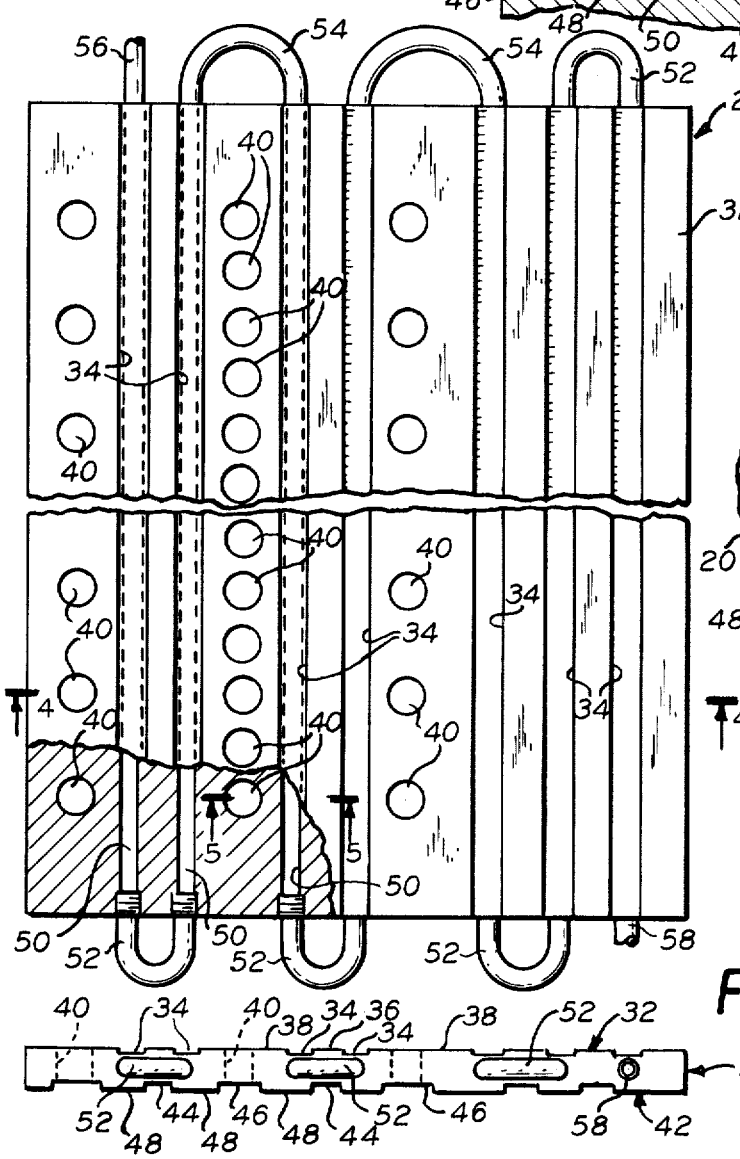
FIG. 2.
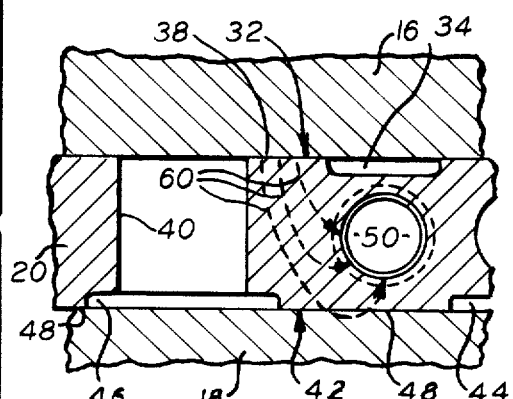
FIG. 5.
FIG. 3.

3,876,358

INJECTION MOLDING SUPPORTING STRUCTURE

BACKGROUND AND SUMMARY OF THE INVENTION

One of the problems encountered in molding machines, which inject high temperature plastic into the molds, has been that the heat from the mold is transmitted to the frame of the machine that supports the mold. This causes thermal expansion of portions of the frame adjacent to the mold, whereas other portions of the frame are at the temperature of the ambient atmosphere and distortions of the frame are produced by the localized unequal heating.

This invention interposes between a mold and the portions of the frame that support it, means for limiting heat flow from the mold to the frame. This means consists of an element, preferably a metal slab, which has discontinuities in its surface that confronts the mold and/or the frame to limit the areas through which heat can be transferred by conduction.

The slab has cooling chambers within it and these chambers are correlated with the discontinuities in the faces of the slab, so that most of the volume of the slab through which heat can be conducted is interrupted by the cooling chambers.

In the preferred construction the discontinuities are grooves with ridges between them; and the slab has these discontinuities on both the upper and lower surfaces. The ridges and grooves in one face are in staggered relation with the ridges and grooves in the other face so that some transverse flow of heat takes place in the slab and this makes it more practical to interpose cooling chambers in the path of the heat flow.

In addition to the surface discontinuities provided by the grooves, the preferred embodiment also includes rows of openings in the faces with the openings spaced from one another lengthwise of the slab and these openings are preferably holes extending all the way through the slab.

The cooling chambers are preferably parallel bores extending through the full length of the slab and with adjacent cooling chambers connected with one another by connecting passages such as U-turn tubes which connect successive cooling chambers in series with one another. Connections are provided at the first and last cooling chamber for the introduction of cooling fluid into the slab and the flow of cooling fluid out of the other end of the slab.

Other objects, features and advantages of the invention will appear or be pointed out as the description proceeds.

BRIEF DESCRIPTION OF DRAWING

In the drawing, forming a part hereof, in which like reference characters indicate corresponding parts in all the views:

FIG. 1 is a diagrammatic view of a molding machine with a mold shown in open position;

FIG. 2 is a greatly enlarged top plan view, partly broken away and in section, of an element located between the mold and the mold supports of FIG. 1;

FIG. 3 is an end view of the element shown in FIG. 2;

FIG. 4 is a sectional view taken on the line 4—4 of FIG. 3 and also showing the surfaces of portions of the mold and metal support structure of FIG. 1; and FIG. 5 is a greatly enlarged sectional view taken on the line 5—5 of FIG. 2.

DESCRIPTION OF PREFERRED EMBODIMENT

FIG. 1 shows a molding machine 10 having a fixed frame 11 with a mold 12 formed in two parts 14 and 16. The lower mold part 16 is supported by a fixed platen 18 and there are means for preventing heat transfer from the fixed mold part 16 to the platen 18 which serves as a part of the fixed frame 11.

This means for preventing heat transfer is an element 20 which comprises a metal slab shaped as shown in FIGS. 2-5 and provided with cooling chambers as will be explained in connection with FIGS. 2-5.

The upper mold part 14, which is the movable part of the mold 12, is connected with a platen 22 which is part of a ram 24 connected to a hydraulic motor in accordance with conventional practice. The platen 22 has extending portions that move along guide dowels 26, also in accordance with conventional practice. Heat transfer from the upper part 14 of the mold to the platen 22 is limited by an element 20' interposed between the mold part 14 and the platen 22 and which may be of similar construction to the metal slab 20.

Openings 30 in the faces of the mold parts 14 and 16 register with one another when the mold is closed; and core rods extend through these openings into cavities of the mold 12 for receiving parisons of hot plastic which is injected into the mold 12 from the side opposite the openings 30. This is also in accordance with conventional practice for injection molding and the material injected into the molds is at high temperature in the region of 400°F. It is through heating of the mold by this high temperature plastic that the problem of heat transfer is introduced into molding machines; and the present invention with the slabs 20 and 20' interposed between the mold parts and the rest of the molding machine prevents excessive heating and objectionable thermal stresses in the parts of the molding machine that support the mold parts 14 and 16.

FIG. 2 is a top plan view of the metal slab 20. The slab 20 has a top surface 32 that confronts and contacts with the bottom surface of the lower mold part 16 (FIG. 1). This top surface 32 has discontinuities consisting of grooves 34, best shown in FIG. 3, which are parallel to one another and which extend for the full length of the slab. There are ridges between the grooves 34. These ridges include narrow ridges 36 between some of the grooves 34 and wider ridges 38 between others of the grooves 34.

There are other discontinuities in the top surface 32 formed by openings 40 in the ridges 38 of the top surface. These openings 40 preferably extend all the way through the slab 20 and they are arranged in rows and spaced from one another lengthwise of the rows as shown in FIG. 2.

The slab 20 has a bottom face 42 with narrow grooves 44 located under the narrow ridges 36 of the top face; and with wider grooves 46 located under the wider ridges 38 of the top face 32. Between these grooves 44 and 42 there are ridges 48 of the bottom face 42. It is a feature of the preferred embodiment that the ridges and grooves of the top surface 32 are in staggered relation with the ridges and grooves of the bottom face 42 so that there is very little metal of the slab through which heat can travel in a straight line from the top surface to the bottom surface at locations which involve no discontinuities in either the top or bottom surface. This feature causes most of the heat to flow with a transverse direction component within the metal of the slab so that the cooling chambers can be located in positions to intercept this heat flow having the transverse component, as will be explained more fully in connection with FIG. 5.

Referring more particularly to FIGS. 2 and 4, there are cylindrical bores 50 located under each of the grooves 34 of the top surface 32.

Tubes 52 and 54, formed with 180° bends are connected with the ends of the bores 50 where the bores open through the opposite ends of the slab 20. These tubes 52 and 54 provide passages connecting successive bores 50 in series with one another. A supply tube 56 connects the first cooling chamber 50 with a source of cooling fluid, which may be water, and there is a discharge tube 58 at one end of the last cooling chamber bore 50 for the exhaust of cooling fluid from the slab 20.

FIG. 5 shows the way in which heat flows by conduction from the mold part 16 through a portion of the top face 32 of the slab 20. The dotted line arrows 60 show the way in which heat flows through the section of the slab 20 on the left side of the cooling chamber 50. The groove 34 above the cooling chamber 50 prevents any heat from flowing by conduction downwardly into the slab 20 at the area covered by the groove 34. The bottom groove 46 prevents heat from flowing by conduction out of the slab 20 into the platen 18. The rows of holes 40 also prevent heat flow by conduction through the slab.

If the cooling chamber 50 were not present in the slab 20, the conduction heat flow from the mold 16 would enter the slab 20 through the surface of the ridge 38 and would flow from the slab 20 into the platen 18 through the surface of the ridge 48. Because of the staggered relation of the ridges 38 and 48 with respect to one another this would cause the heat flow to have a transverse component toward the right in FIG. 5 as it flowed downwardly by conduction through the metal of the slab.

Because of the cooling chamber 50, with cooling fluid flowing through it continuously, there is a heat sink provided by the cooling chamber 50 and the flow of heat is deflected even more toward the right in FIG. 5 by the temperature gradient provided by the cooling chamber 50. Heat that would flow downwardly with only a moderate component of transverse flow is deflected as shown by the dotted arrows 60; and even some heat that flows down to the platen 18 will reverse its flow and flow up into the cooling chamber 50 whenever there is any substantial temperature rise in the platen 18.

There is, of course, some heat transfer by radiation across the discontinuities provided by the grooves 34 and 46 but at the temperatures encountered in molding machines this radiant heat transfer is very limited compared to the transfer of heat by conduction. Any radiation across the groove 34, in FIG. 5, will travel quickly into the cooling chamber 50 through the metal of the slab 50 which is located above the cooling chamber and which forms the floor of the groove 34.

The amount of cooling provided by the slab 20 depends upon the size of the cooling chambers 50 and upon their spacing from one another. It also depends to a great extent upon the velocity of the cooling fluid through the cooling chambers 50 and the cooling can be greatly increased by connecting the cooling chambers 50 so that some or all of them are in parallel instead of being in series as shown in FIG. 2. Experience has shown, however, that with moderate water flow and all of the cooling chambers connected in series, the slab 20 sufficiently limits the flow of heat from the injection mold into the other parts of the molding machine so that no objectionable thermal stresses are set up in the other parts of the molding machine.

The preferred embodiment of the invention has been illustrated and described, but changes and modifications can be made and some features can be used in different combinations without departing from the invention as defined in the claims.

What is claimed is:

1. A molding machine for molding plastic material at high temperatures, including in combination a frame, a mold supported from the frame and having a cavity to which high temperature plastic is supplied, and means for limiting heat flow from the mold to the frame, said means comprising an element located between the mold and the portion of the frame that supports the mold, the element having surfaces on opposite sides thereof facing toward confronting surfaces of the mold and the frame respectively and through which heat must flow in order to pass from the mold to said frame, discontinuities in one of said surfaces for reducing the area thereof through which heat can pass by conduction, and space for cooling fluid in said element coordinated with the discontinuities and in position for absorbing heat that enters said element by conduction through the surfaces between the discontinuities, characterized by said element having grooves in both of its faces that confront the opposing surfaces of the mold and frame, and further characterized by the grooves being parallel to one another and the grooves on one face of said element being staggered with respect to the grooves on the other face so that heat conducted from the surface between the grooves on one face has to flow transversely in said element to reach the space between the grooves in the other face of said element, and the space for cooling fluid in said element being a plurality of cooling chambers extending generally parallel to the grooves and located in the part of said element where the heat has to flow transversely through said element.

2. The molding machine described in claim 1 characterized by the height of each cooling chamber being equal to at least about 40% of the height of said element at the region of the cooling chamber.

3. The molding machine described in claim 1 characterized by the depth of each groove being at least about 10% of the height of said element at the region of the groove.

4. The molding machine described in claim 1 characterized by the cooling chambers being cylindrical passages extending through the full length of said element, and connecting passages at the ends of adjacent parallel cooling chambers connecting said chambers in series of the flow of cooling fluid, means for introducing cooling fluid into one end of a first of the series connected chambers, and means at one end of a last of the series connected chambers for the flow of cooling fluid out of the chambers.

5. The molding machine described in claim 1 characterized by the molding machine being an injection molding machine and the mold being the injection mold of the molding machine, said element being a metal slab with flat top ridges between and separating the grooves, the width of the ridges being approximately equal to the width of the grooves, there being a chamber between each groove and its corresponding ridge on the other face of the slab.

6. A molding machine for molding plastic material at high temperatures, including in combination a frame, a mold supported from the frame and having a cavity to which high temperature plastic is supplied, and means for limiting heat flow from the mold to the frame, said means comprising an element located between the mold and the portion of the frame that supports the mold, the element having surfaces on opposite sides thereof facing toward confronting surfaces of the mold and the frame respectively and through which heat must flow in order to pass from the mold to said frame, discontinuities in one of said surfaces for reducing the area thereof through which heat can pass by conduction, and space for cooling fluid in said element coordinated with the discontinuities and in position for absorbing heat that enters said element by conduction through the surfaces between the discontinuities, characterized by the discontinuities including rows of holes in a face of said element and spaced from one another lengthwise of the row, said holes extending all the way through areas of the face that would otherwise convey heat by conduction into the element.

* * * * *